US008918803B2

(12) United States Patent
Bangalore et al.

(10) Patent No.: US 8,918,803 B2
(45) Date of Patent: Dec. 23, 2014

(54) SYSTEM AND METHOD FOR AUTOMATIC IDENTIFICATION OF KEY PHRASES DURING A MULTIMEDIA BROADCAST

(75) Inventors: Srinivas Bangalore, Morristown, NJ (US); Mazin E. Gilbert, Warren, NJ (US); Michael Johnston, New York, NY (US)

(73) Assignee: AT&T Intellectual Property I, LP, Atlanta, GA (US)

(*) Notice: Subject to any disclaimer, the term of this patent is extended or adjusted under 35 U.S.C. 154(b) by 403 days.

(21) Appl. No.: 12/823,734

(22) Filed: Jun. 25, 2010

(65) Prior Publication Data

US 2011/0321098 A1 Dec. 29, 2011

(51) Int. Cl.
*H04H 60/32* (2008.01)
*G06F 17/30* (2006.01)
*H04N 21/4402* (2011.01)
*H04N 21/462* (2011.01)
*H04N 21/8405* (2011.01)
*H04N 21/235* (2011.01)
*H04N 21/488* (2011.01)
*H04N 7/088* (2006.01)

(52) U.S. Cl.
CPC ...... *H04N 21/4884* (2013.01); *G06F 17/30787* (2013.01); *H04N 21/440236* (2013.01); *G06F 17/30743* (2013.01); *H04N 21/4622* (2013.01); *H04N 21/8405* (2013.01); *G06F 17/30964* (2013.01); *H04N 21/2355* (2013.01); *H04N 7/0884* (2013.01); *G06F 17/30864* (2013.01)
USPC ........ 725/20; 725/9; 725/14; 725/15; 725/16; 725/17; 725/18; 725/19; 725/46; 725/51; 725/112; 725/136

(58) Field of Classification Search
USPC .............. 725/9, 14–20, 46, 51, 53, 112, 136
See application file for complete search history.

(56) References Cited

U.S. PATENT DOCUMENTS

| | | | | |
|---|---|---|---|---|
| 5,481,296 A | * | 1/1996 | Cragun et al. | 725/136 |
| 6,061,056 A | * | 5/2000 | Menard et al. | 715/704 |
| 6,581,207 B1 | * | 6/2003 | Sumita et al. | 725/46 |
| 6,601,103 B1 | * | 7/2003 | Goldschmidt Iki et al. | 709/231 |
| 6,810,526 B1 | * | 10/2004 | Menard et al. | 725/46 |
| 6,961,954 B1 | * | 11/2005 | Maybury et al. | 725/53 |
| 8,037,496 B1 | * | 10/2011 | Begeja et al. | 725/53 |
| 8,115,869 B2 | * | 2/2012 | Rathod et al. | 348/465 |
| 2001/0003214 A1 | * | 6/2001 | Shastri et al. | 725/109 |
| 2001/0049826 A1 | * | 12/2001 | Wilf | 725/120 |
| 2002/0067428 A1 | * | 6/2002 | Thomsen | 348/465 |
| 2002/0147984 A1 | * | 10/2002 | Tomsen et al. | 725/109 |
| 2002/0194592 A1 | * | 12/2002 | Tsuchida et al. | 725/32 |
| 2003/0005461 A1 | * | 1/2003 | Shinohara | 725/110 |
| 2003/0093814 A1 | * | 5/2003 | Birmingham | 725/136 |

(Continued)

*Primary Examiner* — Jason Salce
(74) *Attorney, Agent, or Firm* — Guntin & Gust, PLC; Ralph Trementozzi

(57) ABSTRACT

An Internet Protocol television system includes a user profile agent, a keyword detection agent, and an information search agent. The user profile agent is in communication with a multimedia device, and generates a user profile based on information received from the multimedia device. The keyword detection agent is in communication with the user profile agent, and searches text associated with a multimedia video stream transmitted to the multimedia device for keywords associated with the user profile. The information search agent is in communication with the keyword detection agent, and connects to an information source associated with the keywords detected by the keyword detection agent, and provides additional information associated with the keywords to the multimedia device.

19 Claims, 6 Drawing Sheets

(56) References Cited

U.S. PATENT DOCUMENTS

| | | |
|---|---|---|
| 2003/0172382 A1* | 9/2003 | Kim .................................. 725/53 |
| 2004/0163101 A1 | 8/2004 | Swix et al. |
| 2005/0086688 A1* | 4/2005 | Omoigui ........................... 725/35 |
| 2005/0120391 A1* | 6/2005 | Haynie et al. .................... 725/135 |
| 2005/0273840 A1* | 12/2005 | Mitts et al. ....................... 725/136 |
| 2006/0136383 A1 | 6/2006 | Golla |
| 2007/0143796 A1 | 6/2007 | Malik |
| 2007/0204285 A1* | 8/2007 | Louw ................................ 725/14 |
| 2007/0214488 A1* | 9/2007 | Nguyen et al. ................... 725/134 |
| 2008/0071594 A1 | 3/2008 | Morin |
| 2008/0266449 A1 | 10/2008 | Rathod et al. |
| 2009/0292672 A1* | 11/2009 | Kunjithapatham et al. ....... 707/3 |
| 2010/0071014 A1 | 3/2010 | Brown et al. |
| 2010/0083319 A1 | 4/2010 | Martch et al. |
| 2010/0169930 A1* | 7/2010 | Ito et al. ............................ 725/53 |
| 2011/0289530 A1* | 11/2011 | Dureau et al. .................... 725/38 |

* cited by examiner

SYSTEM AND METHOD FOR AUTOMATIC IDENTIFICATION OF KEY PHRASES DURING A MULTIMEDIA BROADCAST

FIELD OF THE DISCLOSURE

The present disclosure generally relates to communications networks, and more particularly relates to a system and a method for automatic identification of key phrases during a multimedia broadcast.

BACKGROUND

An Internet Protocol television (IPTV) service provider can transmit an IPTV signal to a user via a central office, a serving area interface, and a residential gateway. The IPTV service provider can offer the user a variety of different multimedia broadcasts, such as television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
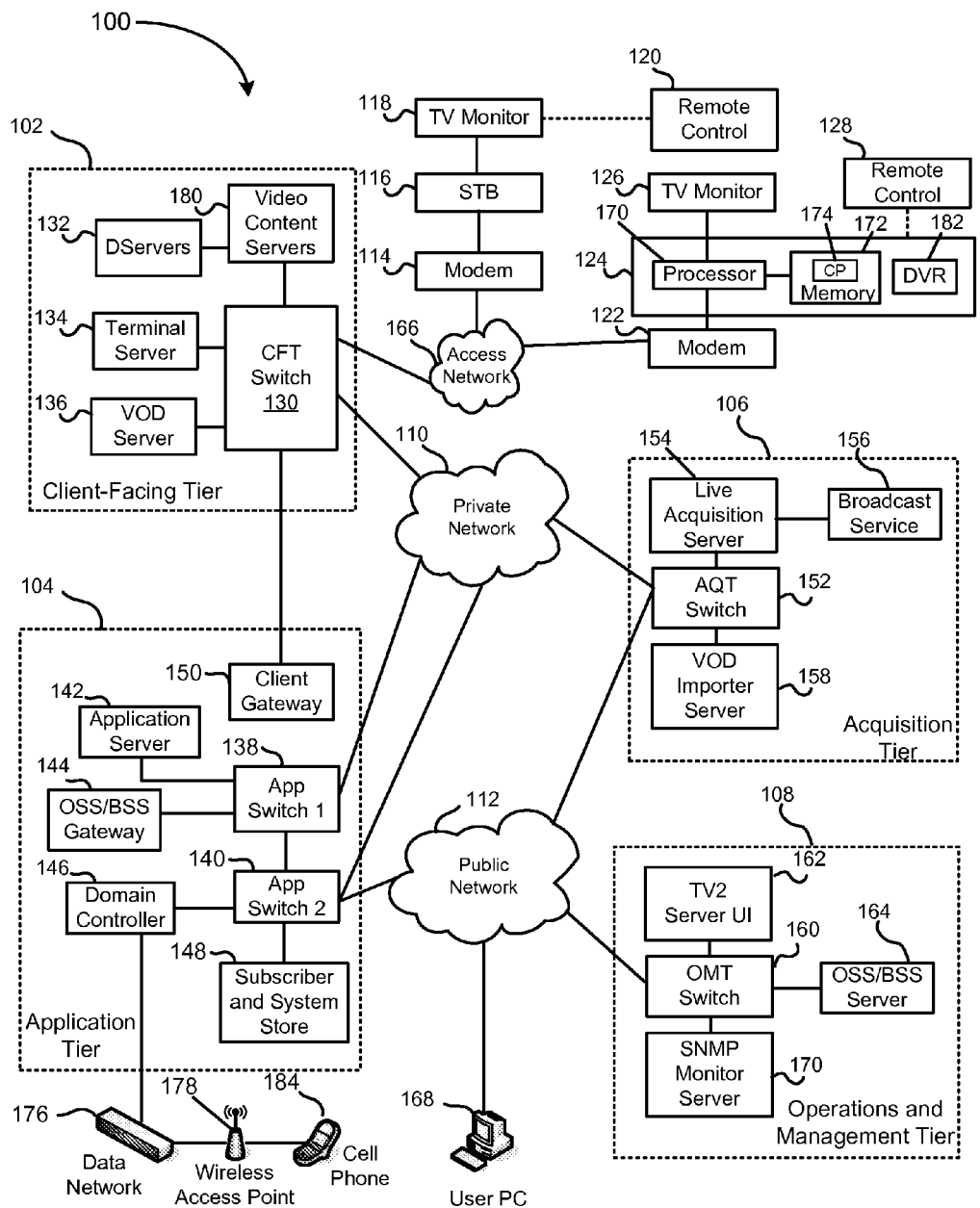
FIG. 1 is a block diagram of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
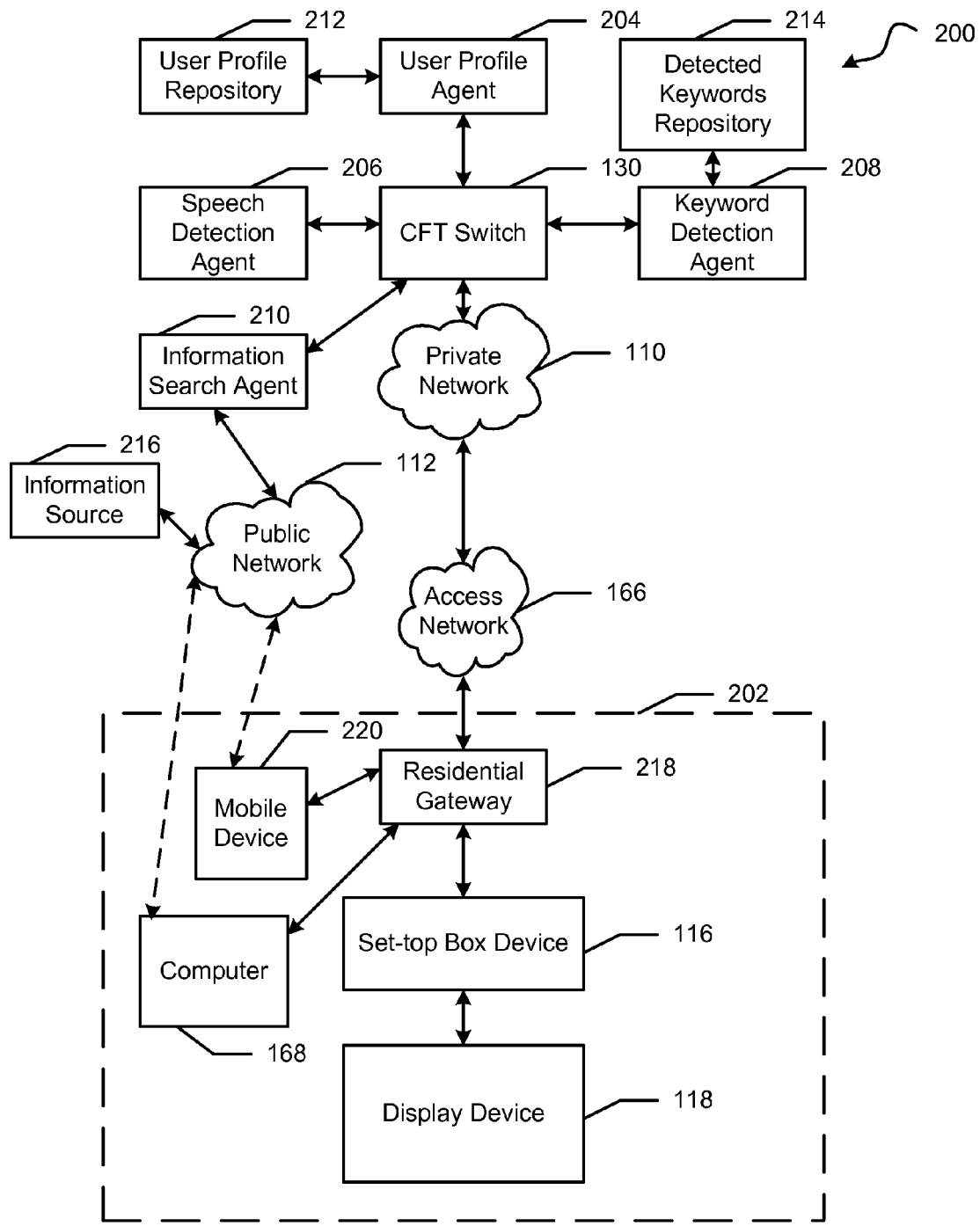
FIG. 2 is a block diagram of a portion of the IPTV system.

FIG. 2 shows a portion 200 of the IPTV system including the private network 110, the public network 112, the CFT switch 130, the access network 166, a customer premises 202, a user profile agent 204, a speech detection agent 206, a keyword detection agent 208, an information search agent 210, a user profile repository 212, a detected keywords repository 214, and an information source 216. The customer premises 202 includes a residential gateway 218, the set-top box device 116, the display device 118, the computer 168, and a mobile device 220. In another embodiment, the computer 168 and the mobile device 220 can be located outside of the customer premises 202.

The residential gateway 218 is in communication with the set-top box device 116, with the computer 168, with the mobile device 220, and with the CFT switch 130 via the access network 166 and the private network 110. The set-top box device 116 is in communication with the display device 118. The CFT switch 130 is in communication with the user profile agent 204, the speech detection agent 206, the keyword detection agent 208, and the information search agent 210. The user profile agent 204 is in communication with the user profile repository 212. The keyword detection agent 208 is in communication with the detected keywords repository 214. In another embodiment, the user profile agent 204, the speech detection agent 206, the keyword detection agent 208, the information search agent 210, the user profile repository 212, and the detected keywords repository 214 can be located in another portion of the IPTV system 100 separate from the CFT switch 130 as long as the user profile agent, the speech detection agent, the keyword detection agent, and the information search agent can access video streams sent to the set-top box device 116, the computer 168, and/or the mobile device 220. The computer 168 and the mobile device 220 can access the IPTV system 100 through the public network 112 without connecting to the residential gateway 218. The user profile agent 204, the speech detection agent 206, the keyword detection agent 208, and the information search agent 210 can be hardware implemented in separate devices or can be combined into one or more devices. The mobile device 220 can be any portable device that is capable of receiving and displaying video streams via a cable television network, an IP network, a cellular network, or the like.

The set-top box device 116 can receive video streams for television programs from the IPTV system 100 via the CFT switch 130, the private network 110, and the access network 166. A user can cause the set-top box device 116 to perform different functions, such as set television programs to be recorded, play back recorded television programs, and view video-on-demand programs. The computer 168 can play video streams that are sent from the IPTV system 100, stored in a memory of the computer, stored on a storage medium connected to the computer or inserted into the computer, or the like. Similarly, the mobile device 220 can play video streams that are sent from the IPTV system 100, stored in a memory of the mobile device, stored on a storage medium connected to the mobile device or inserted into the mobile device, or the like.

The user can utilize the set-top box device 116, the mobile device 220, the computer 168, or the like to create a user profile by entering keywords associated with interests of the user into the set-top box device, the mobile device, or the computer. The keywords can be sent to the user profile agent 204, which in turn can save the keywords as a user profile in the user profile repository 212. The user profile agent 204 can also create the user profile based on the viewing habits of the user. Thus, as the user receives different video streams from the IPTV system 100 via the CFT switch 130, the user profile agent 204 can analyze information, such as metadata information, from the video streams to update the user profile stored in the user profile repository 212.

The operation of the IPTV system 100 with respect to the set-top box device 116, the computer 168, and the mobile device 220 can be substantially similar, such that the description for the operation with respect to the set-top box device can also be applied to the operation with respect to the computer and the mobile device. The keyword detection agent 208 can access the video streams transmitted to the set-top box device 116 and can scan the closed captioning of the video streams for keywords associated with the user profile stored in the user profile repository 212. When the keyword detection agent 208 determines that one or more keywords in the closed captioning of a video stream is related to the user profile, the keyword detection agent can store these keywords in the detected keywords repository 214 for later access by the IPTV system 100. Additionally, if the video streams transmitted to the set-top box device 112, the computer 168, and the mobile device 220 do not have closed captioning, the speech detection agent 206 can convert the speech of the video stream to text. The speech detection agent 206 can then transmit the converted text to the keyword detection agent 208, which in turn can scan the text for keywords associated with the user profile stored in the user profile repository 212.

Figure 3:
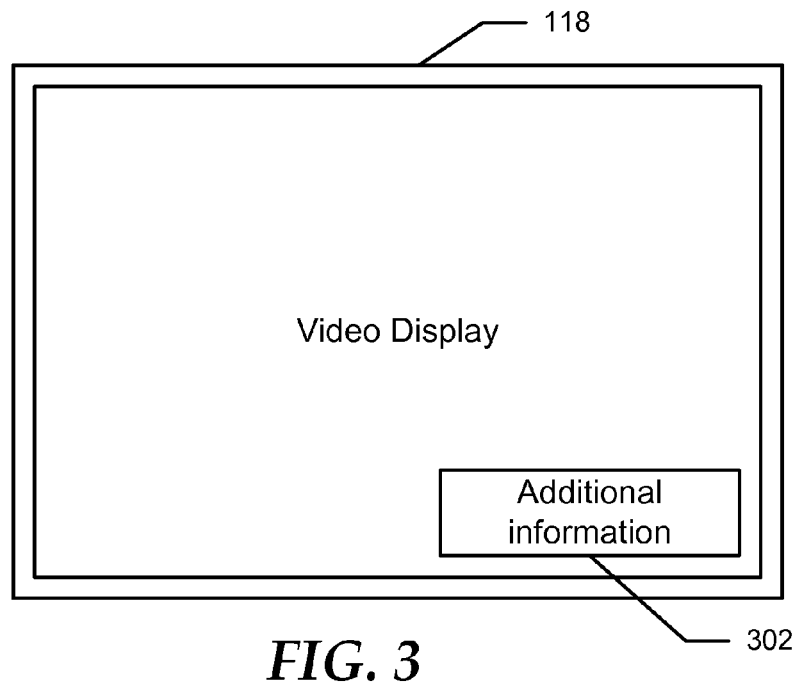
FIG. 3 is an exemplary screen shot of a display device including a selectable graphical icon.

When the keyword detection agent 208 has stored the one or more keywords in the detected keywords repository 214, the user profile agent 204 can send a signal for a selectable graphical icon 302 to the set-top box device 116. The selectable graphical icon 302 can include text indicating that keywords associated with the user profile have been detected in a current video stream and have been stored in the detected keywords repository 214. The set-top box device 116 can receive the signal from the user profile agent 204, and can output the selectable graphical icon 302 along with the current video display of the video stream on the display device 118 as shown in FIG. 3. The user can select the selectable graphical icon 302, and the set-top box device 116 can send a search command associated with the one or more keywords to the information search agent 210.

Figure 4:
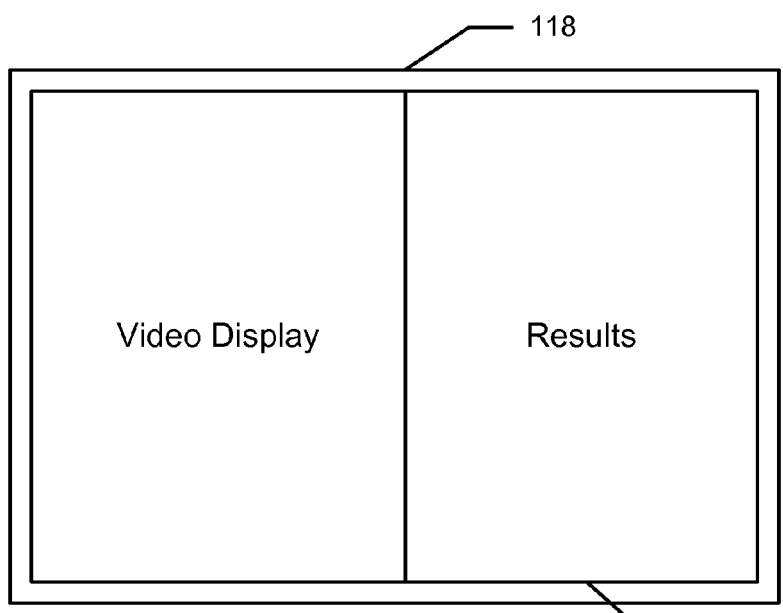
FIG. 4 is another exemplary screen shot of the display device including search results from an information source.

The information search agent 210 can receive the one or more keywords to search from the detected keywords repository 214, and can connect to the information source 216 via the public network 112. The information source can be an electronic commerce (eCommerce) website, a news website, a social media website, or the like. When the information search agent 210 receives information for the one or more keywords from the information source 216, the information search agent can provide the information to the set-top box device 116, which in turn can output the information as results 402 on the display device 118 as shown in FIG. 4. The results 402 can include a website associated with the information source 216. For example, if the information source 216 is an eCommerce website and the keywords are associated with a product sold through the eCommerce website, the results 402 can be a virtual shopping cart with a product or products associated with the one or more keywords already placed in the virtual shopping cart. The user can then navigate through the remaining pages and purchase the product via the set-top box device 116. The results 402 can also be a list of advertisements, coupons for products, price comparisons, news headlines, or the like.

Figure 5:
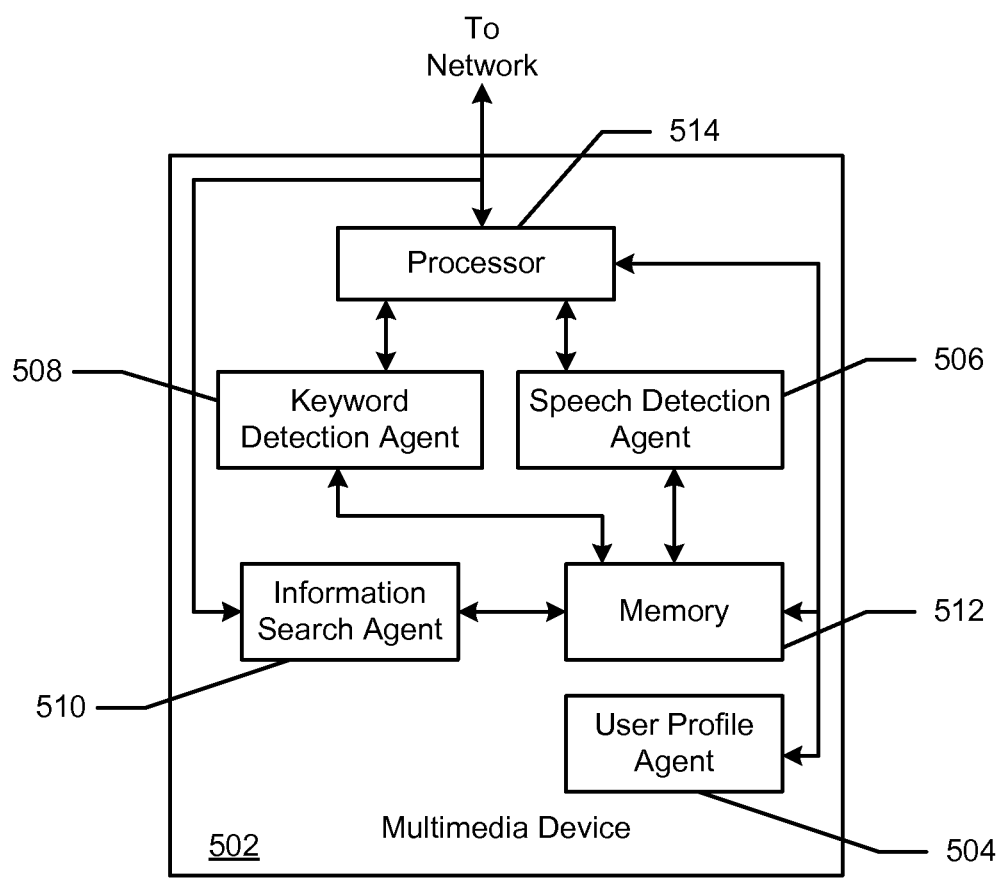
FIG. 5 is a block diagram of a multimedia device associated with the IPTV system.

FIG. 5 shows a block diagram of a multimedia device 502 including a user profile agent 504, a speech detection agent 506, a keyword detection agent 508, an information search agent 510, a memory 512, and a processor 514. The memory 512 is in communication with the user profile agent 504, with the speech detection agent 506, with the keyword detection agent 508, with the information search agent 510, and with the processor 514. The processor 514 is in communication with the user profile agent 504, with the speech detection agent 506, with the keyword detection agent 508, and with the information search agent 510. The multimedia device 502 can be a set-top box device, a computer, a portable media device, a television, a smart cellular telephone, or the like.

The multimedia device 502 can receive video streams from the IPTV system 100, and the processor 514 can output the video streams for display and/or can save the video streams in the memory 512 for later access. The user can utilize the user profile agent 504 of the multimedia device 502 to create a user profile by entering keywords associated with interests of the user, and the user profile agent 504 can store the user profile in the memory 512. The keywords can be entered into the multimedia device 502 via a remote control, a keyboard, a touch sensitive graphical user interface of the multimedia device, or the like. The user profile agent 504 can also create the user profile based on the viewing habits of the user. The user profile agent 504 can determine the viewing habits of the user by accessing metadata information associated with the different video streams that are output for display from the multimedia device 502. Thus, as the multimedia device 502 outputs different video streams, the user profile agent 504 can analyze the metadata information from the video streams to update the user profile stored in the memory 512.

The keyword detection agent 508 can access the video streams that are output from the multimedia device 502, and can scan the closed captioning of these video streams for keywords associated with the user profile stored in the memory 512. The video streams output from the multimedia device 502 and accessed by the keyword detection agent 508 can be either video streams currently being received from the IPTV system 100, or video streams that have been previously saved in the memory 512. When the keyword detection agent 508 determines that one or more keywords in the closed captioning of a video stream is related to the user profile, the keyword detection agent can store these keywords in the memory 512 for later access by the multimedia device 502. Additionally, if the video streams transmitted to the multimedia device 502 or stored in the memory 512 do not have closed captioning, the speech detection agent 506 can convert the speech of the video stream to text. The speech detection agent 506 can then transmit the converted text from the video stream to the keyword detection agent 508, which in turn can scan the text for keywords associated with the user profile stored in the memory 512.

When the keyword detection agent 508 has stored the one or more keywords in the memory 512, the user profile agent 504 can output the selectable graphical icon 302. The user can then select the selectable graphical icon 302, and a search command associated with the one or more keywords can be sent to the information search agent 510. The information search agent 510 can receive the one or more keywords to search, and can connect to the information source 216 via the public network 112 as shown in FIG. 2. When the information search agent 510 receives information for the one or more keywords from the information source 216, the information search agent can output the information as results 402 as described above with respect to FIGS. 2 and 4.

Figure 6:
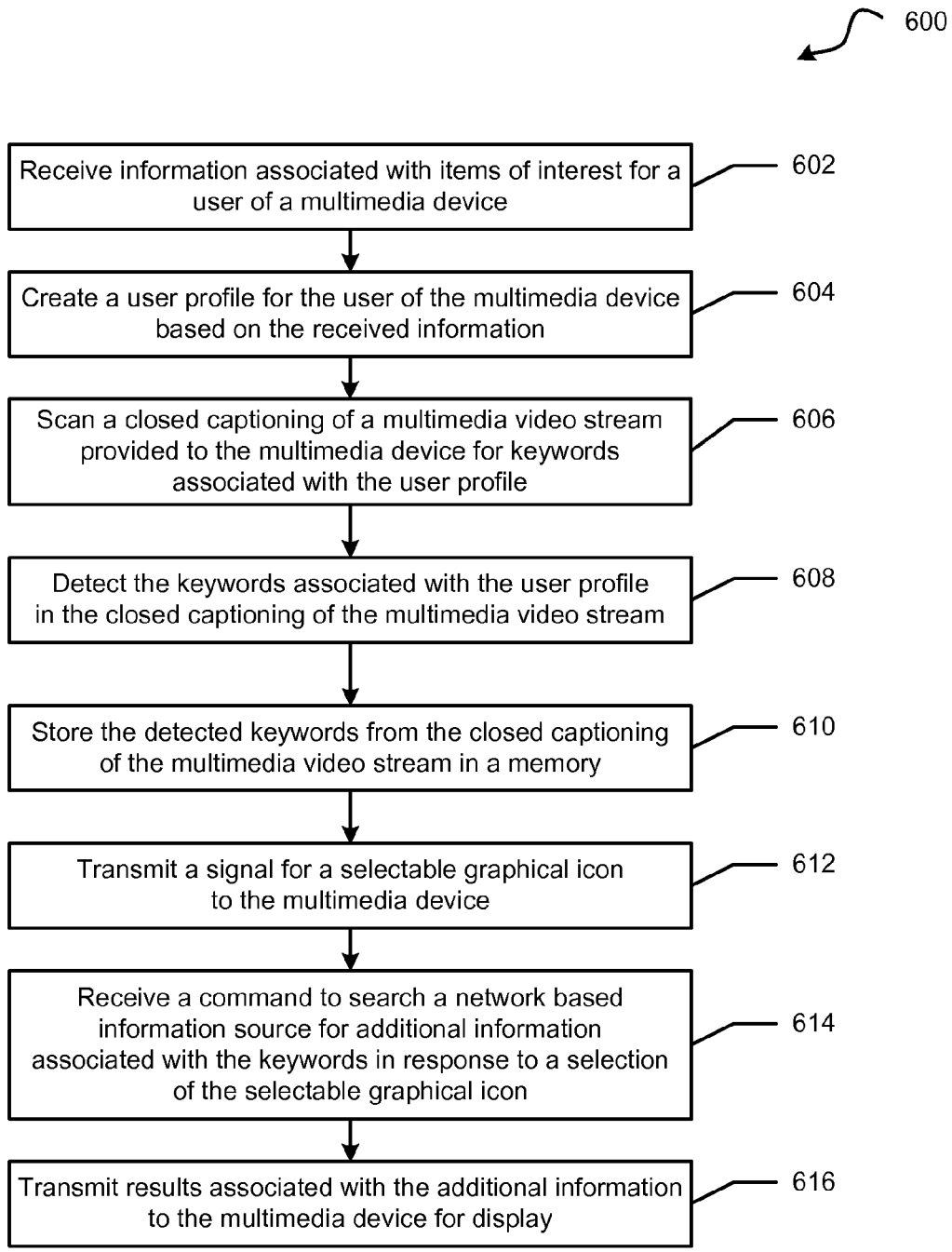
FIG. 6 is a flow diagram of a method for automatic identification of key phrases during a multimedia broadcast.

FIG. 6 shows a flow diagram of a method 600 for automatic identification of key phrases during a multimedia broadcast. At block 602, information associated with items of interest for a user of a multimedia device is received. The information can be received from keywords input into the multimedia device, from metadata information of video streams sent to the multimedia device, or the like. A user profile is created for the user of the multimedia device based on the received information at block 604. At block 606, a closed captioning of a multimedia video stream provided to the multimedia device is scanned for keywords associated with the user profile.

At block 608, the keywords associated with the user profile are detected in the closed captioning of the multimedia video stream. The detected keywords from the closed captioning of the multimedia video stream are stored in a memory at block 610. At block 612, a signal for a selectable graphical icon is transmitted to the multimedia device. A command to search a network based information source for additional information associated with the keywords is received in response to a selection of the selectable graphical icon at block 614. At block 616, results associated with the additional information are transmitted to the multimedia device for display. The results can be offering an object associated with the keywords for purchase by the user, or providing the user with an ability to research the keywords.

Figure 7:
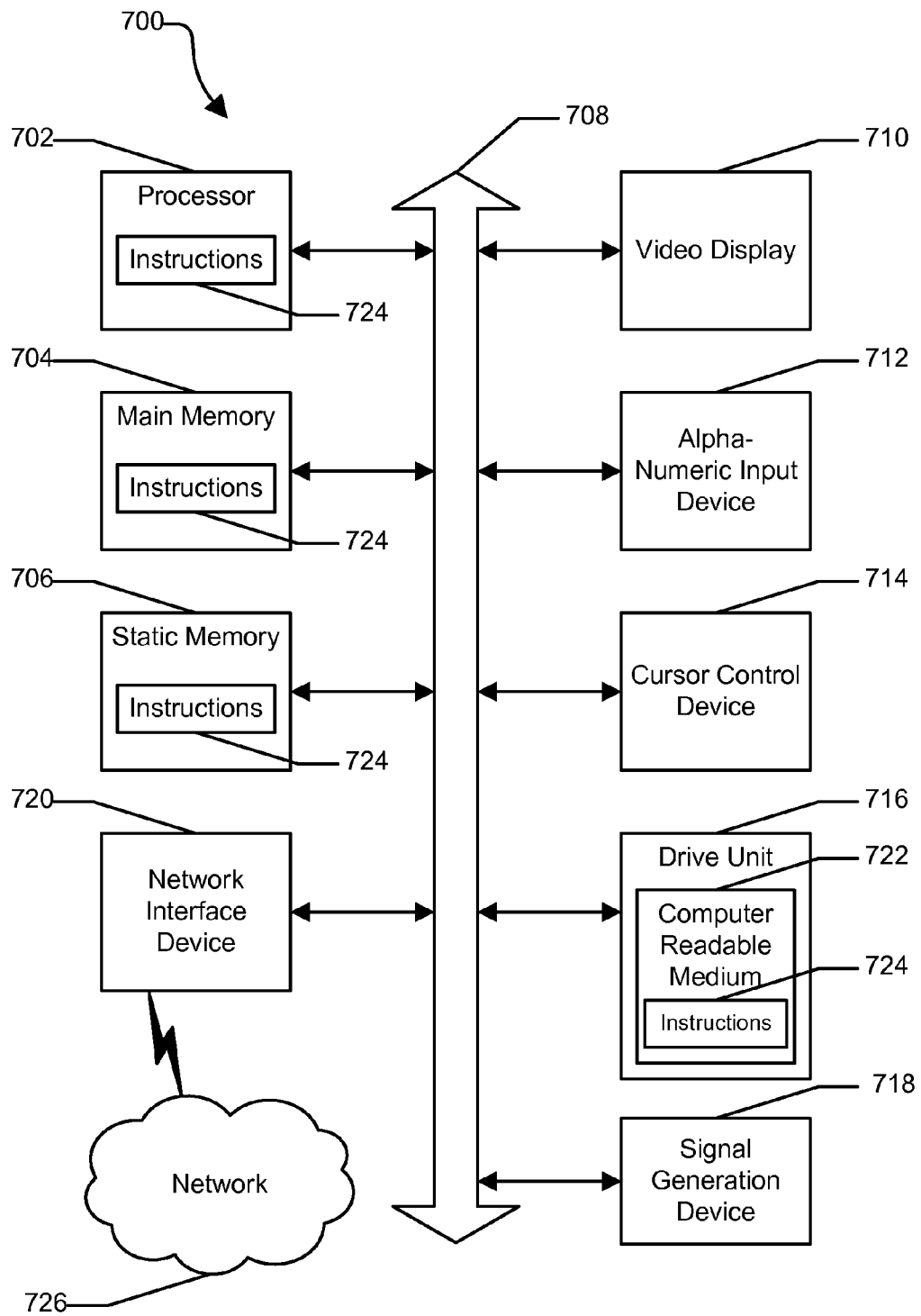
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid state display, or a cathode ray tube (CRT). Additionally, the computer system 700 may include an input device 712 such as a keyboard, and a cursor control device 714 such as a mouse. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
    receiving, by a system comprising a processor, a first video stream of a first television program obtained by way of a multimedia device;
    determining automatically, from the first video stream, information comprising a plurality of keywords associated with user viewing habits;
    creating, by the system, a user profile for the user of the multimedia device based on the information comprising the plurality of keywords;
    storing, by the system, the user profile comprising the plurality of keywords in a user profile repository;
    scanning, by the system, subsequently to the storing of the user profile comprising the plurality of keywords, a closed captioning of a second video stream of a second television program for one of a word or phrase of the plurality of keywords of the user profile;
    storing, by the system, the one of the word or phrase of the plurality of keywords as a second keyword, wherein the second keyword is stored in a detected keyword repository separately from the closed captioning of the second video stream and separately from the user profile repository;
    receiving, by the system, a command to search a network based information source for additional information associated with the second keyword; and
    transmitting, by the system, results associated with the additional information to the multimedia device for display.

2. The method of claim 1 further comprising:
    transmitting, by the system, a signal to the multimedia device to display concurrently with the second video stream a selectable graphical icon in response to the second keyword being stored in the detected keyword repository, wherein the selectable graphical icon provides a textual user indication that the second keyword associated with the user profile have been detected in the second video stream.

3. The method of claim 1 wherein determining, from the first video stream, information comprising the plurality of keywords associated with user viewing habits comprises detecting, by the system, the plurality of keywords associated with the user viewing habits in the closed captioning of the second video stream prior to storing the keywords in the detected keyword repository.

4. The method of claim 1 further comprising:
    offering, by the system, an object associated with the second keyword for user purchase; and providing, by the system, a user ability to research the second keyword.

5. The method of claim 2 wherein the command to search the network based information source indicates that the selectable graphical icon has been selected.

6. The method of claim 1 wherein the results are selected from a group consisting of news events, general information webpages, electronic commerce webpages, and social media webpages.

7. The method of claim 1 wherein the multimedia device is selected from a group consisting of a set-top box device, a computer, a smart cellular telephone, and a portable multimedia device.

8. The method of claim 1, further comprising:
performing an analysis of metadata of the second video stream; and
updating the user profile responsive to the analysis of metadata of the second video stream.

9. An internet protocol television system comprising:
a user profile repository;
a user profile agent, in communication with a multimedia device and the user profile repository, to receive a first video stream of a first television program obtained by way of the multimedia device, to determine automatically from the first video stream, information comprising a plurality of keywords associated with user viewing habits, to generate a user profile based on the information comprising the plurality of keywords, and to store the user profile comprising the plurality of keywords in the user profile repository;
a detected keyword repository;
a keyword detection agent, in communication with the user profile agent and the detected keyword repository, to search, subsequently to the storing of the user profile comprising the plurality of keywords, text associated with a second video stream of a second television program transmitted to the multimedia device for one of a word or phrase of the plurality of keywords, and to stored the one of the word or phrase of the plurality of keywords as a second keyword in the detected keyword repository separately from the text associated with the second video stream and separately from the user profile repository; and
an information search agent, in communication with the keyword detection agent, to connect to an information source associated with the second keyword stored in the detected keyword repository, and provides additional information associated with the second keyword to the multimedia device.

10. The internet protocol television system of claim 9 further comprising:
a speech detection agent in communication with the keyword detection agent, the speech detection agent to perform speech to text conversion on an audio portion of the second video stream.

11. The internet protocol television system of claim 9 wherein the information received at the user profile agent from the multimedia device includes information entered by way of the multimedia device.

12. The internet protocol television system of claim 9 wherein the information source is an electronic commerce website associated with items related to the second keyword from the second video stream.

13. The internet protocol television system of claim 9 wherein the multimedia device is selected from a group consisting of a set-top box device, a computer, a mobile multimedia device, and a smart cellular telephone.

14. A multimedia device comprising:
a user profile agent to receive a first video stream of a first television program obtained by way of the multimedia device, to determine from the first video stream, information comprising a plurality of keywords associated with user viewing habits, and to generate a user profile based on the information comprising the plurality of keywords;
a first memory in communication with the user profile agent, the first memory to store the user profile comprising the plurality of keywords;
a keyword detection agent, in communication with the first memory, to search, subsequently to the storing of the user profile comprising the plurality of keywords, text associated with a second video stream of a second television program output from the multimedia device for one of a word or phrase of the plurality of keywords of the user profile;
a second memory in communication with the keyword detection agent, the second memory to store the word or phrase of the plurality of keywords detected in the text associated with the second video stream as a second keyword separately from the second video stream and separately from the first memory; and
an information search agent, in communication with the memory, to connect to an information source associated with the second keyword detected by the keyword detection agent, and to provide additional information associated with the second keyword for output.

15. The multimedia device of claim 14 further comprising:
a speech detection agent, in communication with the memory, to perform speech to text conversion on an audio portion of the second video stream.

16. The multimedia device of claim 14 wherein the information received at the user profile agent includes a third keyword entered by way of the multimedia device.

17. The multimedia device of claim 14 wherein the information source is an electronic commerce website associated with items related to the second keyword from the second video stream.

18. The multimedia device of claim 14 wherein the multimedia device is selected from a group consisting of a set-top box device, a computer, a mobile multimedia device, and a smart cellular telephone.

19. The multimedia device of claim 14, wherein the user profile agent is further configured to perform an analysis of metadata of the second video stream output from the multimedia device, and to update the user profile responsive to the analysis of the metadata of the second video stream.

\* \* \* \* \*